(12) United States Patent
Deyle

(10) Patent No.: US 9,323,966 B2
(45) Date of Patent: Apr. 26, 2016

(54) DEVICE FOR BACKSCATTER COMMUNICATION

(71) Applicant: Google Inc., Mountain View, CA (US)

(72) Inventor: Travis Deyle, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/502,167

(22) Filed: Sep. 30, 2014

(65) Prior Publication Data

US 2016/0092706 A1 Mar. 31, 2016

(51) Int. Cl.
*G06K 7/10* (2006.01)

(52) U.S. Cl.
CPC .................................. *G06K 7/10316* (2013.01)

(58) Field of Classification Search
CPC .......... G06K 7/10366; G06K 7/10009; G06K 7/10316; G06K 19/0723; G06K 7/0008; G06K 7/10297
USPC ........................................................ 340/10.1
See application file for complete search history.

(56) References Cited

U.S. PATENT DOCUMENTS

| 7,657,227 | B2 | 2/2010 | Doan et al. |
| 7,787,568 | B2 | 8/2010 | Okunev |
| 8,022,825 | B2 | 9/2011 | Rofougaran et al. |
| 8,528,825 | B2 | 9/2013 | Batra |
| 8,610,579 | B2 | 12/2013 | Rofougaran |
| 8,666,353 | B2 | 3/2014 | Walley et al. |
| 8,792,935 | B2 | 7/2014 | Yokoo et al. |
| 2005/0083180 | A1 | 4/2005 | Horwitz et al. |
| 2007/0171071 | A1 | 7/2007 | Chiu et al. |
| 2008/0012710 | A1 | 1/2008 | Sadr |
| 2009/0278688 | A1 | 11/2009 | Tuttle |
| 2009/0309706 | A1 | 12/2009 | Mukherjee et al. |
| 2010/0304684 | A1 | 12/2010 | Duron et al. |
| 2014/0077869 | A1 | 3/2014 | Bas et al. |

FOREIGN PATENT DOCUMENTS

| JP | 2005-278139 A | 10/2005 | |
| WO | WO 01-95243 A2 | 12/2001 | |
| WO | WO 2014/153516 A1 | 9/2014 | |
| WO | WO2014153516 | * 9/2014 | ............... G06K 7/00 |

OTHER PUBLICATIONS

U.S. Appl. No. 14/502,175—Non-Final Office Action, mailed Apr. 8, 2015, 14 pages.
U.S. Appl. No. 14/317,735, filed Jun. 27, 2014, Deyle.
U.S. Appl. No. 14/502,175, filed Sep. 30, 2014, Deyle.

(Continued)

*Primary Examiner* — Mark Blouin
(74) *Attorney, Agent, or Firm* — Blakely Sokoloff Taylor & Zafman LLP

(57) ABSTRACT

Backscatter communication includes receiving electromagnetic energy from a base station and encoding first data and second data. The first data is encoded at a first frequency by adjusting a radar cross-section of a device to modulate the electromagnetic energy reflected back to the base station. The second data is encoded at a second frequency by limiting the adjusting of the plurality of radar cross-sections to either a first subset or a second subset of the plurality of radar cross-sections for a length of time. The second frequency is lower than the first frequency.

22 Claims, 9 Drawing Sheets

(56) References Cited

OTHER PUBLICATIONS

Liu, V. et al., "Ambient Backscatter: Wireless Communication Out of Thin Air", University of Washington, http://abc.cs.washington.edu/files/comm153-liu.pdf, Last accessed Jun. 27, 2014, 13 pages.

Thomas, S. et al., "QAM Backscatter for Passive UHF RFID Tags", 4th IEEE International Conference on RFID (RFID), Apr. 2010, 5 pages.

Thomas, S. et al., "A 96 Mbit/sec, 15.5 pJ/bit 16-QAM Modulator for UHF Backscatter Communication", 6th IEEE International Conference on RFID (RFID), Apr. 2012, 6 pages.

Thomas, S. et al., "Quadrature Amplitude Modulated Backscatter in Passive and Semi-Passive UHF RFID Systems", IEEE Transactions on Microwave Theory and Techniques, vol. 60, Issue 4, Apr. 2012, 8 pages.

Thomas, S. et al., "Rich-Media Tags: Battery-Free Wireless Multichannel Digital Audio and Image Transmission with UHF RFID Techniques", 7th IEEE International Conference on RFID (RFID), Apr. 30, 2013, 6 pages.

Besnoff, J.S. et al., "Battery-Free Multichannel Digital ECG Biotelemetry using UHF RFID Techniques", 7th IEEE International Conference on RFID (RFID), Date of Conference: Apr. 30, 2013-May 2, 2013, 7 pages.

Thomas, S., "Modulated Backscatter for Low-Power High-Bandwidth Communication", Department of Electrical and Computer Engineering Duke University, May 2013, 208 pages.

Sample, A.P. et al. "Design of an RFID-Based Battery-Free Programmable Sensing Platform", IEEE Transactions on Instrumentation and Measurement, vol. 57, No. 11, Nov. 2008, 8 pages.

Miller, G., "Scientists Put Backpacks on Dragonflies to Track Their Brains in Flight", Wired Magazine, Jun. 2013, http://www.wired.com/2013/06/dragonfly-backpack-neuron/, 3 pages.

PCT/US2015/046593—PCT International Search Report and Written Opinion, mail date Dec. 1, 2015, 9 pages. (P278PCT).

Marrocco et al., G. 'Electromagnetic Models for Passive Tag-to-Tag Communication', In: IEEE Transactions on Antennas and Propagation, Nov. 2012. vol. 60, Issue 11. pp. 5381-5389, ISSN 0018-926X (http://ieeexplore.ieee.org/xpl/articleDetails.jsp?arnumber=6237507).

PCT/US2015/046595—PCT International Search Report and Written Opinion, mail date Nov. 26, 2015, 10 pages. (P279PCT).

U.S. Appl. No. 14/502,175—Final Office Action, mailed Nov. 4, 2015, 17 pages.

* cited by examiner

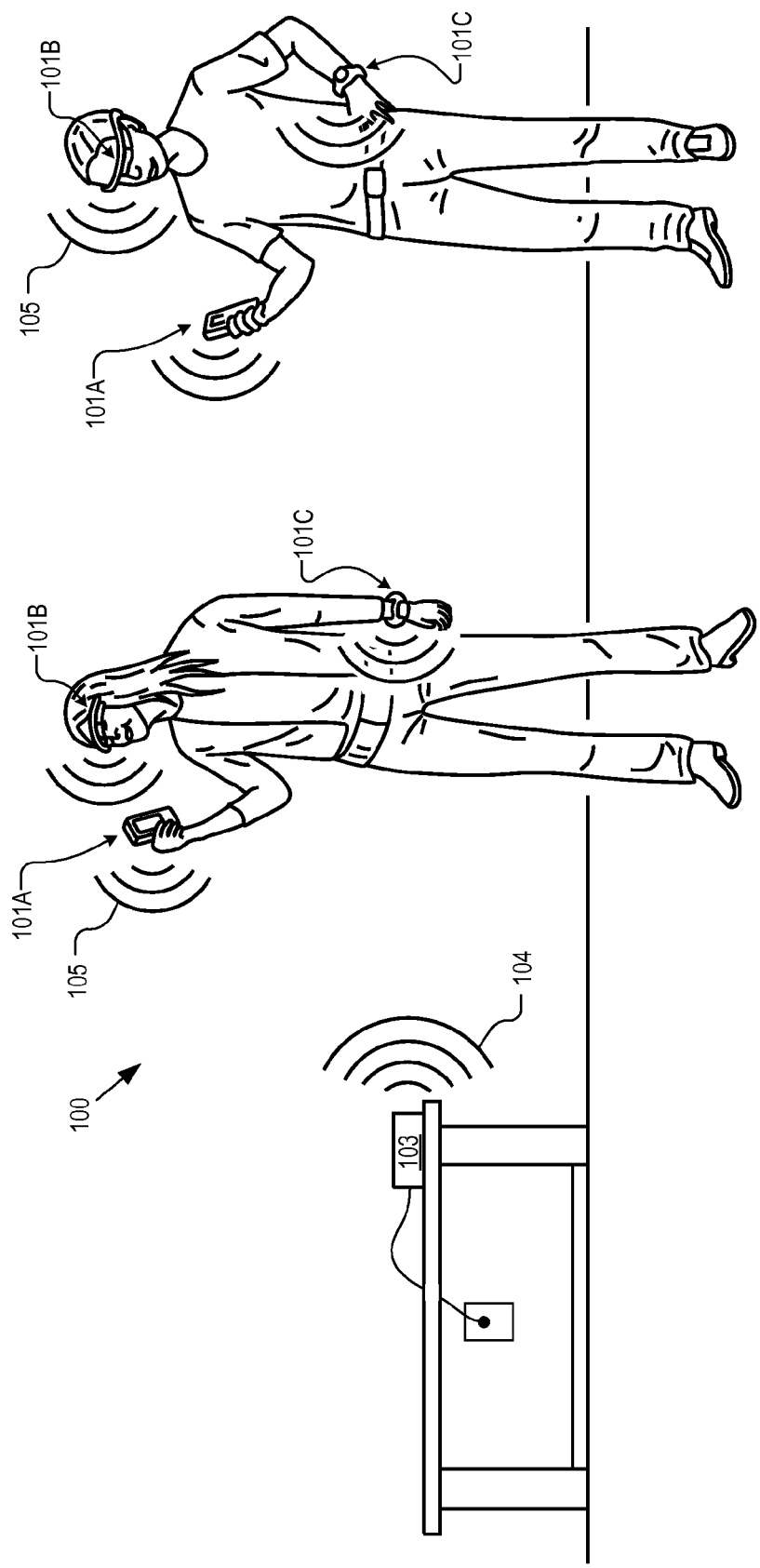

_US 9,323,966 B2_

DEVICE FOR BACKSCATTER COMMUNICATION

REFERENCE TO RELATED APPLICATIONS

The present application is related to a U.S. application Ser. No. 14/502,175 entitled "Receiver for Backscatter Communication," filed on the same day, Sep. 30, 2014.

TECHNICAL FIELD

This disclosure relates generally to backscatter communication, and in particular but not exclusively, relates to radio-frequency identification ("RFID") tags.

BACKGROUND INFORMATION

Radio-frequency identification ("RFID") communication is one example of backscatter communication. RFID communication generally includes a "base station transceiver" that broadcasts/transmits electromagnetic energy and then interprets data from reflections of the broadcasted electromagnetic energy. A "tag" reflects a portion of the electromagnetic energy back to the base station in order to communicate data to the reader. To encode data (e.g. an identification number) in the reflected portion, a passive (battery-free) tag may harvest power from the broadcasted electromagnetic energy and use the harvested power to modulate the electromagnetic energy reflected back to the base station. In contrast, a battery-powered tag uses a battery to power circuitry that modulates the electromagnetic energy reflected back to the base station. Passive tags generally have a range that is much shorter than battery powered tags.

Backscatter communication (including RFID communication systems) is increasingly important as the tags can be manufactured relatively small and RFID communication doesn't require line-of-site between the base station and the tag. As RFID communication systems become more prevalent, demand has increased for sending larger amounts of information in shorter periods of time using backscatter communication.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 1 illustrates a backscatter communication system including a base station and tags, in accordance with an embodiment of the disclosure.

DETAILED DESCRIPTION

Figure 2A:
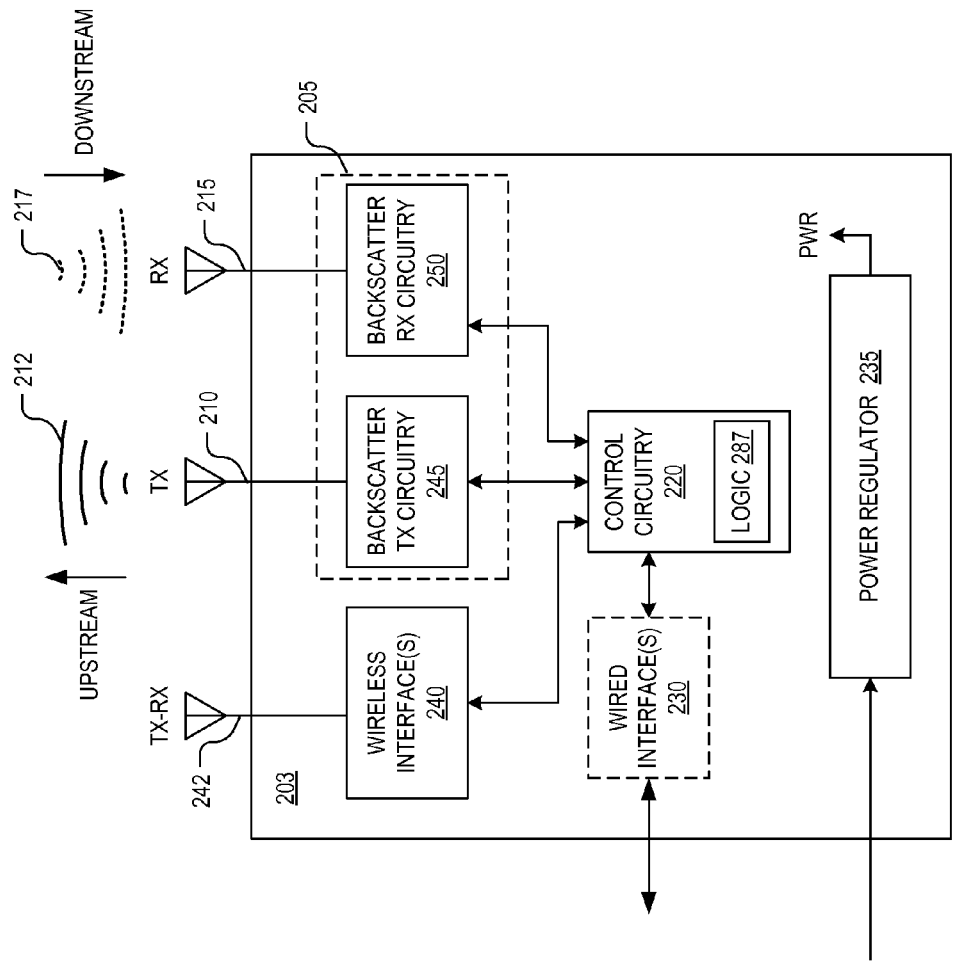
FIG. 2A is a functional block diagram illustrating a base station for facilitating backscatter communication, in accordance with an embodiment of the disclosure.

Embodiments of a system and method for backscatter communications are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1 illustrates a backscatter communication system 100 that includes a base station transceiver 103 and tags included in mobile devices 101, in accordance with an embodiment of the disclosure. Backscatter communication system 100 uses backscatter communications to provide a short range (e.g., up to 20 m), high bandwidth (e.g., 20 to 100 Mbps), and low power (e.g., less than 1 mW) wireless communication link to deliver data from one or more mobile devices 101 to base station 103. One example of backscatter communication is commonly known as Radio-Frequency Identification ("RFID"). RFID is often used to wirelessly communicate an identification code of an object (e.g. key card, consumer product). However, backscatter communications including RFID can also be used to stream data sets that are larger than mere identification codes/numbers The backscatter communication link is achieved by integrating backscatter tags (e.g., semi-passive tags) into mobile devices 101. The design leverages asymmetric power budgets between wired base station 103 and mobile devices 101 to provide a low power solution on the mobile device side by relying upon the readily available power on the base station side.

Base station 103 includes one or more antennas that broadcast electromagnetic ("EM") energy 104 towards mobile devices 101 and receive modulated backscatter reflections 105 of EM energy 104. Modulated backscatter reflections 105 are referred to as the backscatter signal or backscatter channel. The backscatter tags integrated into mobile devices 101 do not transmit any RF or microwave power. Rather, they operate by modulating the reflections of EM energy 104. The backscatter reflections are encoded with the data by modulating the radar signatures or radar cross-section of mobile devices 101 with data and base station 103 demodulates the received radar signatures reflected from mobile devices 101 to extract the embedded data. One technique for modulating the radar cross-section of mobile devices 101 is to modulate an impedance load coupled to the backscatter antenna on mobile device 101. This impedance modulation is a low power task when compared to an active transmitter such as WiFi or Bluetooth radio.

Some Radio-Frequency Identification ("RFID") tags are fully passive devices that include no independent power source and harvest their energy for operation from EM energy 104. However, energy harvesting from EM energy 104 effectively slows the data rate of the backscatter channel, since the backscatter antenna will typically be optimized for harvesting power and not necessarily improving the signal-to-noise ratio ("SNR") of the backscatter channel. Additionally, fully passive RFID tags often pause for periodic power harvesting, which interrupts or delays data transmission. Energy harvesting reduces the read range for base station 103 because more incident EM radiation 104 is required to power up a backscatter tag than is required for the backscatter communications alone. Conventional fully passive backscatter tags employ slower data rates, as energy consumption on the backscatter tag is highly dependent on clock speed.

Embodiments of the backscatter tags embedded within mobile devices 101 may be partially passive devices, which do not harvest energy from EM radiation 104. Rather, the backscatter tags are powered by the main battery of mobile devices 101. Since modulating the impedance load requires a modest power budget (e.g., 15 uW), the backscatter transmission does not impact battery life in a significant manner. Additionally, by not harvesting power from EM energy 104, the backscatter antennas and modulation load impedances can be optimized for reflecting EM energy 104 to improve SNR, reduce bit rate errors, and increase data throughput of the backscatter channel. By not harvesting power from EM energy 104 to power the backscatter tag, some embodiments disclosed herein can operate with higher clock rates and greater data throughput. Other embodiments of the disclosure may harvest energy from EM energy 104.

EM energy 104 may be broadcast using a variety of different carrier frequencies. For example, EM energy 104 may operate on unencumbered frequencies such as 915 MHz, 2.45 GHz, 5.8 GHz, and 61.25 GHz. The backscatter tags may modulate the backscatter signal using a variety of techniques and symbol constellations for encoding the data onto the backscatter channel. For example, binary phase shift keying ("BPSK") or binary amplitude shift keying ("BASK") may be used. To achieve higher data rates, quadrature amplitude modulation ("QAM") may be used to modulate the load impedances applied to the backscatter antenna to change the vector radar cross section ("RCS") of the antenna. Using higher carrier frequencies and larger QAM constellations (e.g., 16-QAM, 64-QAM, etc.) can achieve higher data rates (e.g., 100 Mbps). In some embodiments, the symbol constellation for encoding data on the backscatter channel can be adaptively updated based upon the environment (e.g., noise, multi-path reflections, etc.) to improve throughput, improve SNR, or make the backscatter link less susceptible to degradation as a mobile device 101 moves through their environments.

Mobile devices 101 represent a variety of different devices, including mobile phones 101A, head wearable displays 101B, smart wrist watches 101C, tablets, laptops, body-mountable devices, body implantables, or other mobile devices operating with limited power budgets. Embodiments disclosed herein provide a backscatter channel having sufficient bandwidth to wirelessly stream data (e.g. video data, audio data, text data) from the mobile devices 101 to base station 103. Base station 103 may then transfer the streamed data via a wired (e.g. Ethernet) or wireless (e.g. WiFi) connection to other devices such as televisions, servers, or other mobile devices. In the illustrated embodiment, base station 103 is a standalone box. In other embodiments, base station 103 may be integrated into a television, home computer, computer monitor, WiFi access point, cable modem, hard-drive, router, set-top box, or other electronic device. In an embodiment where base station 103 is, or is included in a WiFi access point, EM energy 104 could be the WiFi transmission and tags could reflect EM energy 104 back to base station 103.

FIG. 2 is a functional block diagram illustrating an example base station 203 for facilitating backscatter communication, in accordance with an embodiment of the disclosure. Base station 203 is one possible implementation of base station 103 illustrated in FIG. 1. The illustrated embodiment of base station 203 includes a backscatter transceiver 205, backscatter antennas 210 and 215, control circuitry 220, wired interface(s) 230, a power regulator 235, and one or more wireless communication antenna(s) 242. The illustrated embodiment of backscatter transceiver 205 includes backscatter transmit circuitry 245 and backscatter receive circuitry 250. The illustrated embodiment of control circuitry 220 includes logic 287. FIG. 2 illustrates functional components of base station 203 and not necessarily a structural layout. It should be appreciated that the components of base station 203 may be implemented entirely in hardware, entirely in software/firmware, or using a hybrid of both software/firmware and hardware.

Backscatter transceiver 205 is the communication channel for delivering high bandwidth data from mobile devices 101 to base station 203. In one embodiment, the upstream direction from backscatter transmit circuitry 245 is a non-communicative path, but merely outputs EM energy 212 as a sort of radar signal. In other embodiments, backscatter transmit circuitry 245 can modulate data onto EM energy 212 to provide an upstream broadcast data path to mobile devices 101. Backscatter transmit circuitry 245 can output EM energy 212 having a variety of different frequencies such as 915 MHz, 2.45 GHz, 5.8 GHz, 61.25 GHz, or otherwise. Backscatter receive circuitry 250 implements the downstream path from mobile devices 101 and operates by demodulating the backscatter signal reflected by mobile devices 101. In essence, backscatter receive circuitry 250 is demodulating the received radar signature reflected from mobile devices 101. The radar signature or backscatter signal may be modulated using a variety of different techniques and symbol constellations including, BPSK, BASK, QAM or otherwise. As such, backscatter receive circuitry 250 includes the requisite filters, mixers, amplifiers, decoders, framers, and the like to demodulate/decode the appropriate modulation scheme. Although FIG. 2 illustrates separate transmit and receive antennas, in other embodiments, a single backscatter antenna may be used to both transmit EM energy 212 and receive the backscatter signal 217. In other embodiment, multiple transmit and receive antennas may be used along with beam forming and tracking techniques.

Wireless interface(s) 240 represent one or more wireless communication channels that do not use backscatter communications. For example, wireless interface(s) 240 may be implemented using a WiFi transceiver, a Bluetooth transceiver, an infrared transceiver, or other standardized/proprietary wireless communication systems. Wireless interface(s) 240 may facilitates non-backscatter communications with mobile devices 101 or with other devices. The wireless interface(s) 240 may also provide a wireless network connection to the Internet or other consumer products (e.g., network attached storage, etc.) for base station 203.

Wired interface(s) 230 may include any number of wired communication ports. For example, wired interfaces 230 may include an Ethernet controller, a universal serial bus ("USB") port, or otherwise. The Ethernet controller may provide a network connection as well.

Power regulator 235 provides a wired power connection for powering the internal components of base station 203. Since base station 203 is a wired device, it is not constrained by a limited power budget like mobile devices 101. Backscatter communications leverage this asymmetric power budget by pushing the power hungry generation of EM energy 212 into base station 203 while mobile device 101 operate by reflecting EM energy 212 (not independently generating EM radiation) generated at base station 203.

Control circuitry 220 is the operational brains of base station 200. It includes logic 287 for coordinating the operation of the other functional components and includes a processor and/or a field-programmable-gate-array ("FPGA") for computational executions. Logic 287 may include hardware logic or software/firmware instructions stored on one or more memory devices. For example, logic 287 may include instructions for establishing a wireless session with one or more mobile devices 101, configuring and managing the wireless display sessions, and terminating the wireless display sessions.

Many commercial backscatter tags operate by encoding data using two discrete states. However, by using a larger number of states (increasing the constellation of available communication symbols), quadrature amplitude modulation ("QAM") can be achieved to deliver higher data rates in backscatter communication. For example, using sixteen states (e.g. 16-QAM) may result in a quadrupling of the data rate at the tradeoff of a lower SNR. Additionally, pairing the increase in communication symbols with an increased data frequency has been shown to enable very high data rates (e.g. ~100 Mbps). The higher data rates are usable for streaming data for large data application (e.g. cloud backup, video data).

To increase the constellation of available communication symbols beyond two data states (e.g. digital zero and one), the tag involved in the backscatter communication must be able to generate the increased number of communication symbols. Furthermore, generating the increased number of communication symbols at higher frequencies allows for high-speed channel having higher data rates than are available conventionally. However, to ensure that a tag is also able to communicate using the conventional low-speed schemes (having two data states), a tag that could communicate data using both the low-speed scheme and the disclosed high-speed data transmission would be advantageous. Accordingly, tags disclosed in the disclosure are configured to achieve high-speed data transfer as well as be backward compatible to the conventional (e.g. "Gen 2") lower-speed RFID protocol to ensure that the tag is able to communicate with existing base stations that utilize existing RFID protocols. Conventional lower-speed data may be sent at 125 kHz. while the higher-speed data may be sent at 25 MHz.

Figure 3A:
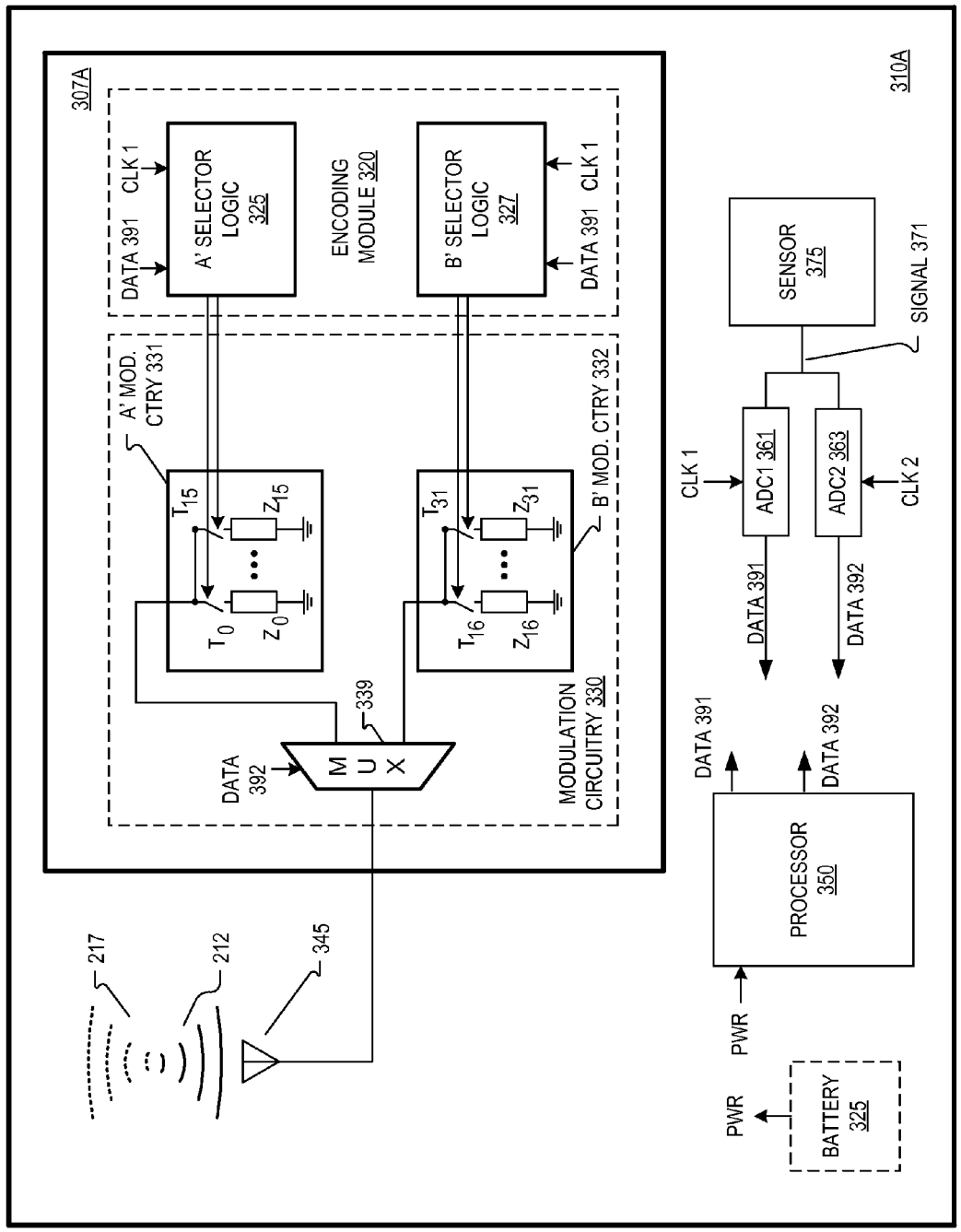
FIG. 3A illustrates a block diagram of a device that includes an example tag, in accordance with an embodiment of the disclosure.

FIG. 3A illustrates a block diagram of an example device 310A that includes an example tag 307A, in accordance with an embodiment of the disclosure. Device 310A may be one of the mobile devices described in FIG. 1. Example device 310A includes battery 325, processor 350, sensor 375, first analog-to-digital converter ("ADC") 361, a second ADC 363, and an antenna 345. Tag 307A includes modulation circuitry 330 and encoding module 320.

Antenna 345 is configured to receive electromagnetic radiation/energy (e.g. EM energy 212) from an antenna of a backscatter base station, such as antenna 210 of base station 203. Antenna 345 may also be configured to receive cellular data (e.g. 3G, 4G, LTE), WiFi (e.g. IEEE 802.11), and/or Bluetooth data. In other words, an existing antenna on a mobile device may be utilized for backscatter communication.

Modulation circuitry 330 is coupled to modulate antenna 345 between a plurality of impedance values ($Z_0$-$Z_{31}$ in FIG. 3A) applied to the antenna. Changing the impedance values of antenna 345 is one way of changing the vector radar cross-section of device 310A. Changing the vector radar cross-section changes the backscatter signal 217 that antenna 345 reflects back to base station 203, which allows tag 307A to communicate data back to base station 203.

Modulation circuitry 330 includes A' modulation circuitry 331, B' modulation circuitry 332, and 2-1 multiplexer ("MUX") 339. A' modulation circuitry can only modulate the impedance of antenna 345 between a first subset of impedances values $Z_0$-$Z_{15}$. Impedances $Z_0$-$Z_{15}$ function to communicate sixteen symbols available for communicating with base station 203 (e.g. to implement 16-QAM signaling). B' modulation circuitry can only modulate the impedance of antenna 345 between a second subset of impedances values $Z_{16}$-$Z_{31}$. Impedances $Z_{16}$-$Z_{31}$ function as sixteen corresponding symbols that communicate the same symbol as impedances $Z_0$-$Z_{15}$. For example, in one embodiment, adjusting antenna 345 to impedance $Z_0$ would communicate the same symbol to base station 203 as adjusting antenna 345 to impedance $Z_{16}$. In that example, $Z_0$ and $Z_{16}$ are corresponding impedances that communicate the same corresponding symbols. It is appreciated that the having 32 impedances values ($Z_0$-$Z_{31}$) that includes subsets of 16 impedance values is merely exemplary and that more or less impedance values may be utilized in different embodiments.

Encoding module 320 includes A' selector logic 325 and B' selector logic 327. Encoding module 320 encodes first data 391 at a first higher frequency (CLK1) by directing modulation circuitry 330 to select between the plurality of impedances $Z_0$-$Z_{31}$. Encoding module 320 is also coupled to encode second data 392 at a second frequency (CLK2) by directing modulation circuitry 330 to select among either a first subset $Z_0$-$Z_{15}$ or a second subset $Z_{16}$-$Z_{31}$ of the plurality of impedance values $Z_0$-$Z_{31}$. CLK2 operates at a lower frequency than CLK1.

In FIG. 3A, A' selector logic 325 is coupled to receive first data 391 and CLK1 operating at the first frequency. A' selector logic 325 is coupled to encode first data 391 at the first frequency by directing A' modulation circuitry 331 to select between $Z_0$-$Z_{15}$. B' selector logic 327 is also coupled to receive first data 391 and CLK1. B' selector logic 327 is coupled to encode first data 391 at the first frequency by directing B' modulation circuitry 332 to select between $Z_{16}$-$Z_{31}$. MUX 339 is coupled to receive data 392. The digital values of second data 392 change corresponding to CLK2 which is at a lower frequency than the frequency of first data 391 and CLK1. The digital values of data 392 cause 2-1 MUX 339 to either couple the impedance values from A' modulation circuitry 331 or B' modulation to antenna 345. Hence, the impedance value applied to antenna 345 is limited to the first subset of impedance values of A' modulation circuitry 331 when second data 392 has a first state (e.g. digital zero) and the impedance value applied to antenna 345 is limited to the second subset of impedance values of B' modulation circuitry 332 when second data 392 has a second state (e.g. digital one).

A' selector logic 325 and B' selector logic 327 may be implemented using microcontrollers, a logic array, discrete logic, or custom Application-Specific integrated circuit ("ASIC"). A' modulation circuitry 331 may be implemented with transistors $T_0$-$T_{15}$ that can be activated to connect different impedance values $Z_0$-$Z_{15}$ to MUX 339 (and ultimately antenna 345). Similarly, B' modulation circuitry 332 may be implemented with transistors $T_{16}$-$T_{31}$ that can be activated to connect different impedance values $Z_{16}$-$Z_{31}$. Of course, other non-transistor switches capable of switching at high frequencies can be used in place of transistors. Those skilled in the art also appreciate that alternative techniques and configurations for connecting different impedance values to antenna 345 may be implemented.

Figure 5:
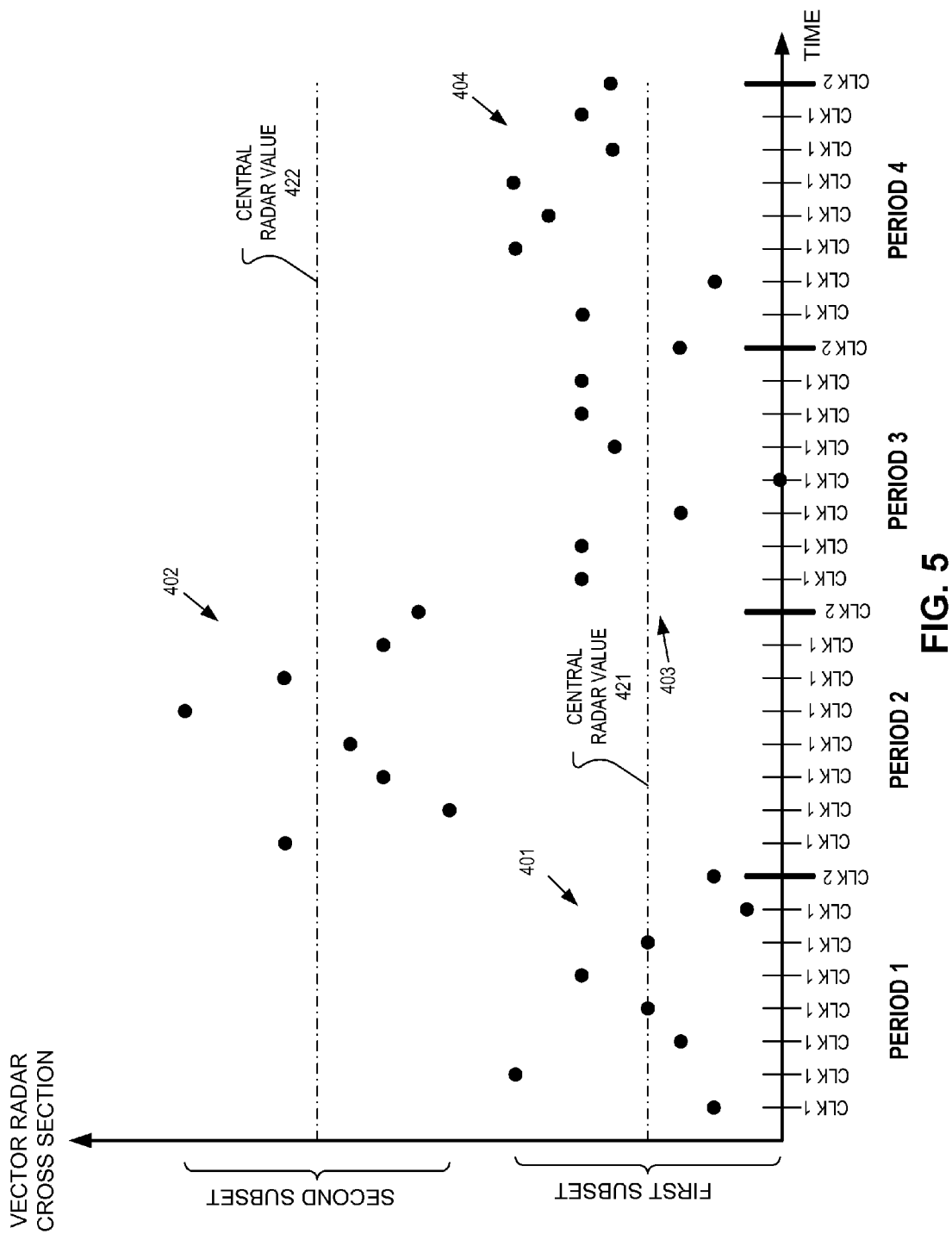
FIG. 5 illustrates a chart showing vector radar cross sections over time of an antenna, in accordance with an embodiment of the disclosure.

Attention is directed to FIG. 5 to further show how FIG. 3A communicates both a high-speed data stream and a lower-speed data stream via backscatter techniques. FIG. 5 illustrates a chart showing vector radar cross sections ("RCSs") over time of an antenna in a tag, in accordance with an embodiment of the disclosure. It is appreciated that the vector RCSs values in FIG. 5 are illustrative to convey an overall concept of giving different vector RCSs values to an antenna, but in operation the vector RCSs will include complex vector RCSs rather than strictly real vector RCS values. Furthermore, the impedance values applied to the antenna to give the antenna a given vector RCS value may be a complex impedance value. FIG. 5 shows a first, second, third, and fourth period. Each period corresponds with the period associated with the frequency of CLK2. The collection of vector RCS values in the first, second, third, and fourth periods are illustrated as groups 401, 402, 403, and 404, respectively.

In the first period, antenna 345 is modulated to different vector RCS values (by applying different impedance values to antenna 345, for example) to encode first data 391 as different symbols that correspond with the first subset of impedance values (e.g. $Z_0$-$Z_{15}$). In the second period, antenna 345 is also modulated to different vector RCS values to encode first data 391 as different symbols that correspond with the second subset of impedance values. The first group of vector RCS values 401 is close to central radar value 421 while the second group of vector RCS values 402 is closer to central radar value 422. When the vector RCS values of antenna 345 are closer to central radar value 421 for a period of CLK2, it conveys a first data state (e.g. digital zero) of second data 392 while vector RCS values closer to central radar value 422 for a period of CLK2 conveys a second data state (e.g. digital one) of second data 392. Thus, groups 401, 402, 403, and 404 convey that second data 392 is zero-one-zero-zero in the first, second, third, and fourth periods of FIG. 5. By modulating antenna 345 in this way, tag 307A can communicate first data 391 as high-speed data corresponding to CLK1 and also communicate second data 392 as low-speed data corresponding to CLK2 by switching between the first subset of impedance values and the second subset of impedance values to encode the second data. Since the tag must switch between the subsets of impedance values to communicate the low-speed data, each symbol in the constellation of symbols being communicated has a impedance value in the first subset that communicates that symbol and a corresponding impedance value in the second subset that also communicates that symbol so a particular high-speed symbol can be communicated regardless of whether the first subset or the second subset of impedance values is being utilized. Of course, the changing impedance values (to change the vector RCS of the antenna) are merely an implementation of modulating the backscatter signal by adjusting the in-phase and out-of-phase (i.e. I and Q quadrature) nature of the backscatter signal that is reflected back to the base station.

A base station that is receiving the backscatter from tag 307A can apply a filter (either analog or digital) with a cutoff frequency between the first frequency (CLK1) and the second frequency (CLK2) to isolate second data 392. Applying the filter will filter out the higher frequency data, but the combination of the higher frequency symbols will still come through as closer to a radar signal corresponding to central radar value 421 or central radar value 422 to indicate two different discrete states of lower-speed second data 392. It is understood that the word "central" in the term "central radar value" could be associated with a particular mapping (e.g. a specific region of a Smith Chart) from the backscatter signal to the signal received by the base station. Such mappings are not necessarily linearly related to tag impedances, not necessarily uniformly distributed, depend heavily on the RF link between tag and base station, and are highly depended on the constellation of vector RCS values employed.

Returning to FIG. 3A, sensor 375 is coupled to provide a signal 371 to both ADC1 361 and ADC2 362. Signal 371 may be a voltage, a current, or otherwise. Sensor 375 may be a biometric sensor that measures glucose or heart-rate, for example. ADC1 361 samples signal 371 at a first frequency associated with CLK1. ADC2 362 samples signal 371 at a second frequency associated with CLK2.

Figure 4A:
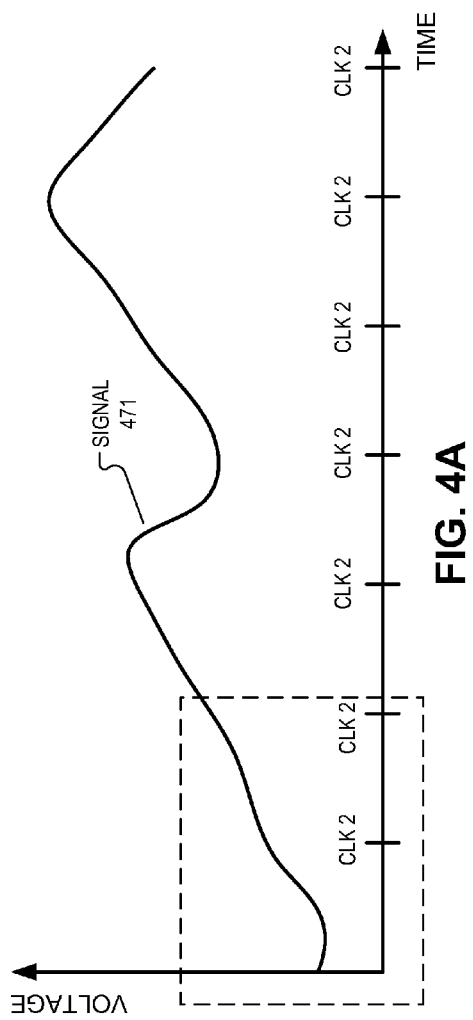
FIG. 4A illustrates a chart showing the voltage of a signal over time, in accordance with an embodiment of the disclosure.
Figure 4B:
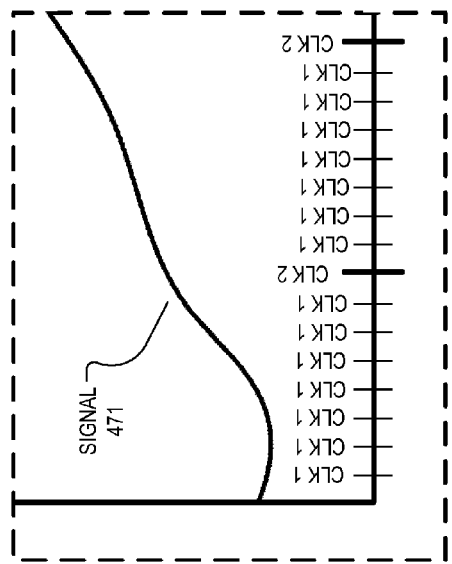
FIG. 4B illustrates a zoomed-in portion of the chart in FIG. 4A, in accordance with an embodiment of the disclosure.

FIGS. 4A and 4B show that the first frequency (CLK1) is a higher frequency than the second frequency (CLK2). FIG. 4A illustrates a chart showing the voltage of a signal 471 over time and FIG. 4B illustrates a zoomed-in portion of the chart in FIG. 4A, in accordance with an embodiment of the disclosure.

Signal 471 is an example of signal 371. Since ADC1 361 samples signal 471 at a faster rate than ADC2 362 samples signal 471, first data 391 has a higher resolution than second data 392. In one example, only one ADC is used to sample a signal at the first frequency (CLK1) and a subset of that signal sampled at the second frequency (CLK2) is sent as second data 392. For example, an ADC could select every $10^{th}$ or every $100^{th}$ sample to correspond to second data 392. Alternatively, the data from one ADC could be processed to provide summary data as second data 392. One application for this implementation would be to send electrocardiography ("ECG") heart signals where the waveform signal has diagnostically relevant details at the higher frequency, but the lower frequency could still indicate heartbeat in beats per minute. When tag 307A simultaneously encodes first data 391 and second data 392 by changing the impedance of antenna 345, it can encode both the higher resolution first data 391 and the lower resolution second data 392. Therefore, a base station configured to read the higher speed data protocol will be able to receive the higher resolution first data 391. However, if the base station is not configured to read the higher-speed data protocol (a legacy base station), it will still be able to read the lower-speed data protocol and will be able to still receive the lower-speed data 392. The lower-speed data 392 protocol may be EPC Gen2 backwards compatible so that legacy base stations can read the lower-speed data 392.

Processor 350 may also be coupled to send data to tag 307A for backscatter communication. In one embodiment, processor 350 has access to a memory and processor sends data from the memory to tag 307A to send the data to a base station. In one embodiment, medical records are stored in a memory and processor 350 facilitates streaming those medical records to the base station using tag 307A. In one embodiment, processor 350 is the main processor of device 310A. In one embodiment, first data 391 and second data 392 include the same data content. Consequently, first data 391 is simply encoded faster than second data 392 and a base station that is configured to receive the higher-speed protocol will receive the data content faster on the high-speed channel. However, a legacy base station will still be able to receive the same data content as second data 392 on the lower-speed channel. This configuration enables the updated base station to receive data faster from tag 307A while still enabling a non-updated base station to receive the same data, albeit at a slower rate.

Figure 3B:
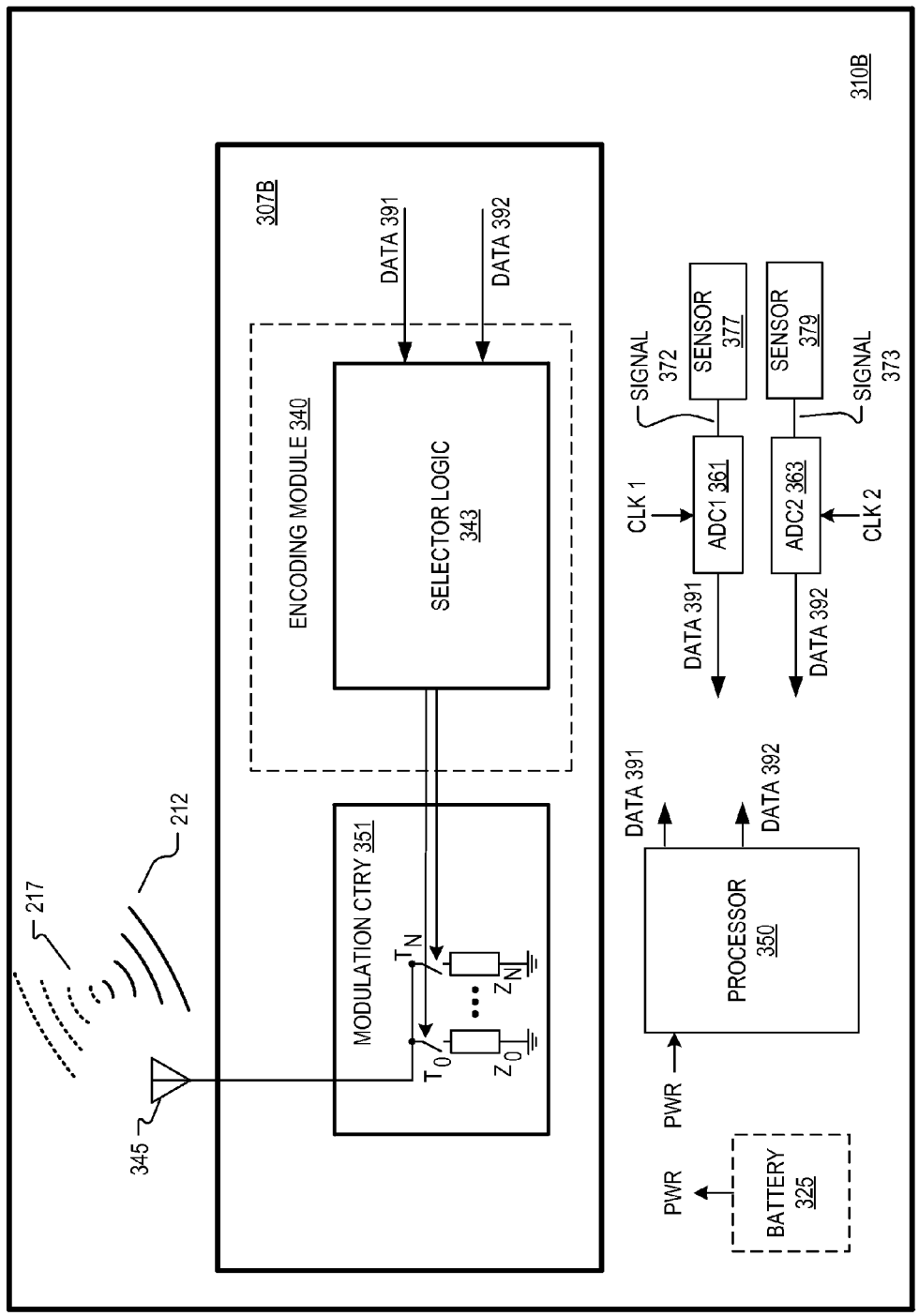
FIG. 3B illustrates a block diagram of a device that includes an example tag, in accordance with an embodiment of the disclosure.

FIG. 3B illustrates a block diagram of a device 310B that includes an example tag 307B, in accordance with an embodiment of the disclosure. Tag 307B shows a different hardware configuration of performing the same functions as described in association with tag 307A. Tag 307B includes encoding module 340 and modulation circuitry 351. Modulation circuitry 351 is coupled to modulate antenna 345 between a plurality of impedance values $Z_0$-$Z_N$. Encoding module 340 is coupled to encode first data at a first frequency by directing modulation circuitry 351 to select between its impedance values $Z_0$-$Z_N$. Encoding module 340 is also coupled to encode second data at a second frequency by directing modulation circuitry 351 to select among either a first subset or a second subset of the plurality of impedance values $Z_0$-$Z_N$. Encoding module 340 includes selector logic 343. Selector logic 343 may be implemented with a microprocessor or discrete logic. Selector logic 343 receives first data 391 and second data 392. When second data 392 is a first data state (e.g. digital zero), selector logic 343 limits its selection of impedance values $Z_0$-$Z_N$ to a first subset of impedance values. When second data 392 is a second data state (e.g. digital one), selector logic 343 limits its selection of impedance values $Z_0$-$Z_N$ to a second subset of impedance values.

Device 310B includes sensor 377, sensor 379, first ADC 361, second ADC 363. Sensor 377 provides signal 372 to first ADC 361 and sensor 379 provides signal 373 to second ADC 363. Sensor 379 may be a heart-rate sensor, while sensor 377 may sense audio data (i.e. a microphone). In one embodiment, the sensor that requires the lower data rates is coupled to generate second data 392 while the sensor that requires the higher data rate is coupled to generate first data 391. It is understood that the different sensor configurations illustrated in FIGS. 3A and 3B may be used in either Figure to generate first data 391 and second data 392.

In the examples illustrated in FIGS. 3A and 3B, the first subset of impedance values may include impedance values that are common to the second subset of impedance values. In a different embodiment, the first subset of impedance values may be not share impedance values with the second subset of impedance values.

Figure 2B:
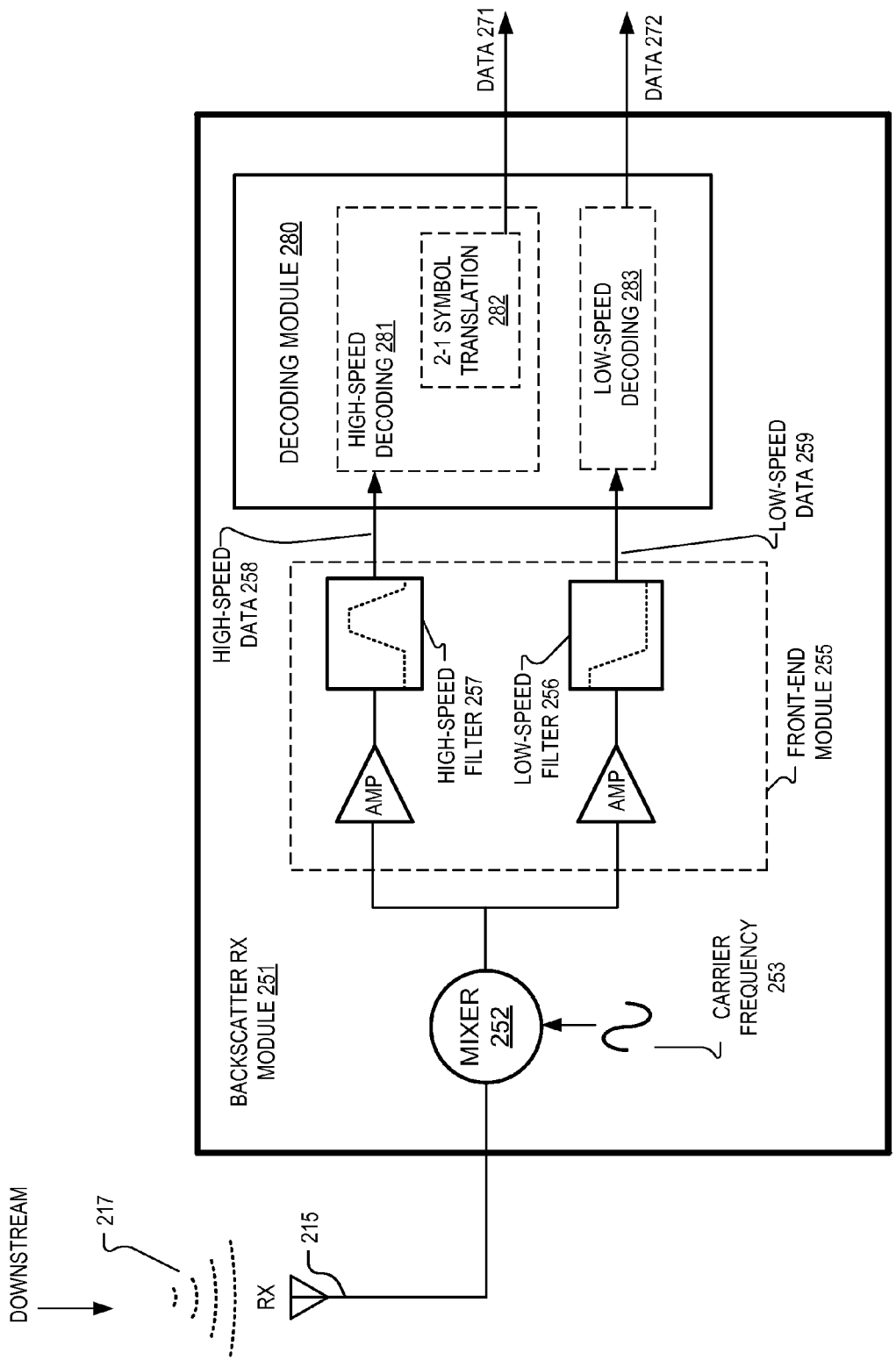
FIG. 2B is a functional block diagram illustrating example backscatter receiving circuitry, in accordance with an embodiment of the disclosure.

After tag 307A or 307B encodes the data into backscatter signal 217, the backscatter signal 217 is received by antenna 215 and decoded by backscatter receiving circuitry 250. FIG. 2B is a functional block diagram illustrating backscatter receiving module 251 as one possible example of backscatter receiving circuitry 250, in accordance with an embodiment of the disclosure.

Backscatter receiving module 251 includes mixing block 252, front-end module 255, and decoding module 280. Front-end module 255 includes low-speed filter 256 and high-speed filter 257. Decoding module 280 includes a high-speed decoding module 281 having symbol translation unit 282. Decoding module 280 also includes low-speed decoding module 283. Backscatter receiving module 251 will likely include additional analog and/or digital filters, ADCS, framing, and equalization modules and circuitry that are not specifically illustrated as to not obscure the invention.

Mixing block 252 is coupled to receive backscatter signal 217 from receiving antenna 215 and coupled to receive carrier frequency 253. Carrier frequency 253 will be the same as the frequency of the EM energy 212 (the transmission signal) and mixing block 252 multiplies backscatter signal 217 by carrier frequency 253 to isolate the modulated portions of backscatter signal 217 that contain data. The modulated portions of the backscatter signal continue on to front-end module 255. High-speed filter 257 and low-speed filter 256 both receive the backscatter signal as they are configured in parallel in FIG. 2B. The backscatter signal may be optionally amplified prior to reaching the filters.

Low-speed filter 256 is configured to isolate the low-speed data from the high-speed data. If the high-speed data is encoded by a tag (e.g. 307A or 307B) into backscatter signal 217 at a first frequency (e.g. 25 MHz.) and low-speed data is encoded at a second frequency (e.g. 125 kHz.), low-speed filter 256 isolates the low-speed data by filtering out frequencies that are above 125 kHz. For example, low-speed filter 256 may be a low pass filter with a cutoff frequency between the first frequency and the second frequency. Therefore, low-speed filter 256 passes low-speed data 259 in response to the backscatter signal. Since, low-speed filter 256 filters out the high-speed transitions of the high-speed data, the values of the high-speed symbols are effectively averaged. This filtering determines whether the high-speed symbols are from a first subset of the symbols or a second subset of the symbols at a given time period because the value of the low-speed data will indicate which subset of symbols was utilized during the given time period. When the high-speed symbols are being received in the first subset (for a certain length of time), it indicates a first state (e.g. zero) of the low-speed data and when the high-speed symbols are being received in the second subset (for the certain length of time), it indicates a second state (e.g. digital one) of the low-speed data. The length of time that the high-speed symbols need to stay in a subset to indicate a certain data state corresponds with a period of the second frequency (e.g. 125 kHz.).

The high-speed symbols include a first subset of symbols and a second subset of symbols. The first subset of symbols may correspond to the first subset of impedance values described in FIGS. 3A and 3B. Similarly, the second subset of symbols may correspond to the second subset of impedance values described in FIGS. 3A and 3B. Each symbol in the first subset has a corresponding symbol in the second subset so that tag 307 can communicate the full constellation of symbols whether or not it is utilizing the first subset of vector radar cross-sections of the antenna (which are generated by the first subset of impedances) or the second subset of vector radar cross-sections of the antenna (which are generated by the second subset of impedances). The corresponding symbols communicate the same data value even though different symbols are used. In one embodiment, $Z_0$ corresponds with $Z_{16}$, $Z_1$ corresponds with $Z_{17}$ ... and $Z_{15}$ corresponds with $Z_{31}$. So in that embodiment, giving antenna 345 either $Z_0$ or $Z_{16}$ communicates the same symbol or data character.

High-speed filter 257 is configured to pass high-speed data 258 in response to receiving the backscatter signal. High-speed filter 257 may include a bandpass filter to isolate the high-speed data. Either or both of high-speed filter 257 and low-speed filter 256 may be implemented by a processor configured as a software-defined-radio.

High-speed decoding module 281 receives high-speed data 258 and low-speed decoding module 283 receives low-speed data 259. High-speed decoding module 281 is configured to generate first data 271 by decoding the high-speed symbols encoded at a first frequency (e.g. 25 MHz.). Tag 307 may have encoded the high-speed symbols at the first frequency (CLK1) by modulating the impedance of antenna 345. If tag 307 is utilizing QAM, high-speed decoding module 281 will include a QAM decoding unit. Low-speed decoding module 283 is configured to output second data 272 in response to low-speed data 259, which was encoded at a second frequency (e.g. 125 kHz.). Tag 307 may have encoded the low-speed data at the second frequency (CLK2) by driving MUX 339 to limit the impedance values of antenna 345 to the first or second subset of impedance values corresponding to circuitry 331 or 332.

High-speed decoding module 281 includes 2-1 symbol translation unit 282 in FIG. 2B. Since the high-speed symbols include a first subset and a second subset of symbols and a given symbol in the first subset has a corresponding symbol in the second subset that communicates the same symbol or data character, symbol translation unit 282 outputs the proper data character in response to receiving either of the corresponding symbols. Decoding module 280 may also include a checksum to ensure accurate data reception.

Figure 6:
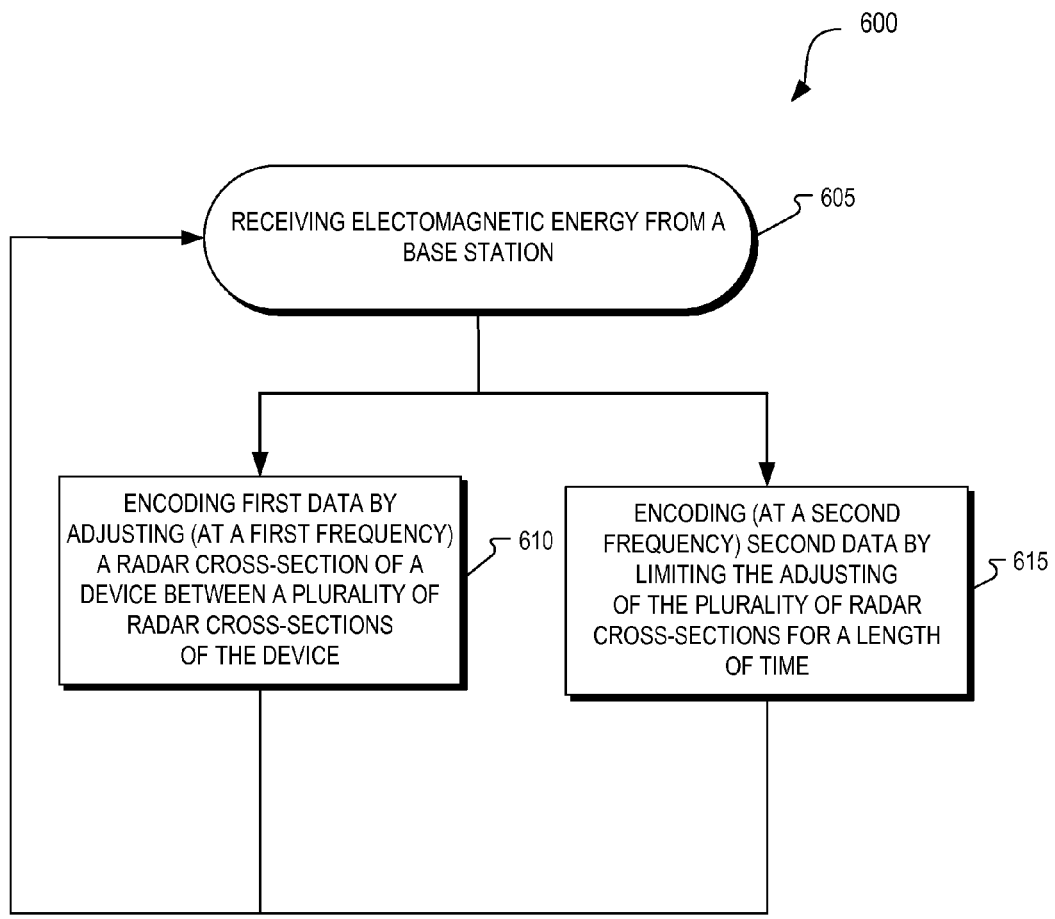
FIG. 6 illustrates a flow chart illustrating a tag-side method of backscatter communication, in accordance with an embodiment of the disclosure.

FIG. 6 illustrates a flow chart illustrating a process of tag-side backscatter communication, in accordance with an embodiment of the disclosure. The order in which some or all of the process blocks appear in process 600 should not be deemed limiting. Rather, one of ordinary skill in the art having the benefit of the present disclosure will understand that some of the process blocks may be executed in a variety of orders not illustrated, or even in parallel.

In process block 605, electromagnetic energy (e.g. EM energy 212) is received from a base station. First data is encoded (at a first frequency) by adjusting a radar cross-section of a device between a plurality of radar cross-sections, in process block 610. In the examples illustrated in FIGS. 3A and 3B, the vector radar cross-section of antenna 345 is adjusted by modulating the impedance of the antenna between a plurality of impedance values. However, there are additional ways of adjusting a radar cross-section of a device. For example, micro-electro-mechanical systems ("MEMS") can be manipulated to change the radar cross-section of a device. For example, MEMS that adjust a tilt of a radar reflecting material (e.g. metal) also changes the radar cross-section of a device. Furthermore, multiple MEMS could be manipulated in patterns (in addition to tilt control) to generate different radar cross-sections. Another way to adjust the radar cross-section of device includes infusing metallics into liquid crystal and controlling the alignment of the metallics using the liquid crystal and in turn changing the radar cross-section of a device. Here again, an array of independently selectable liquid crystals having infused metallics would also create additional adjustability of the radar cross-section to generate a plurality of different radar cross-sections. Additional ways of adjusting a radar cross section includes varactors, PIN diodes, variable attenuators, and variable phase shifters.

In process block 615, second data is encoded (at a second frequency that is lower than the first frequency) by limiting the adjusting of the plurality of radar cross-section for a period of time. The period of time corresponds with a period of the second frequency. Process 600 continues to encode first data and second data, as needed to communicate the required amount of data to a base station.

Figure 7:
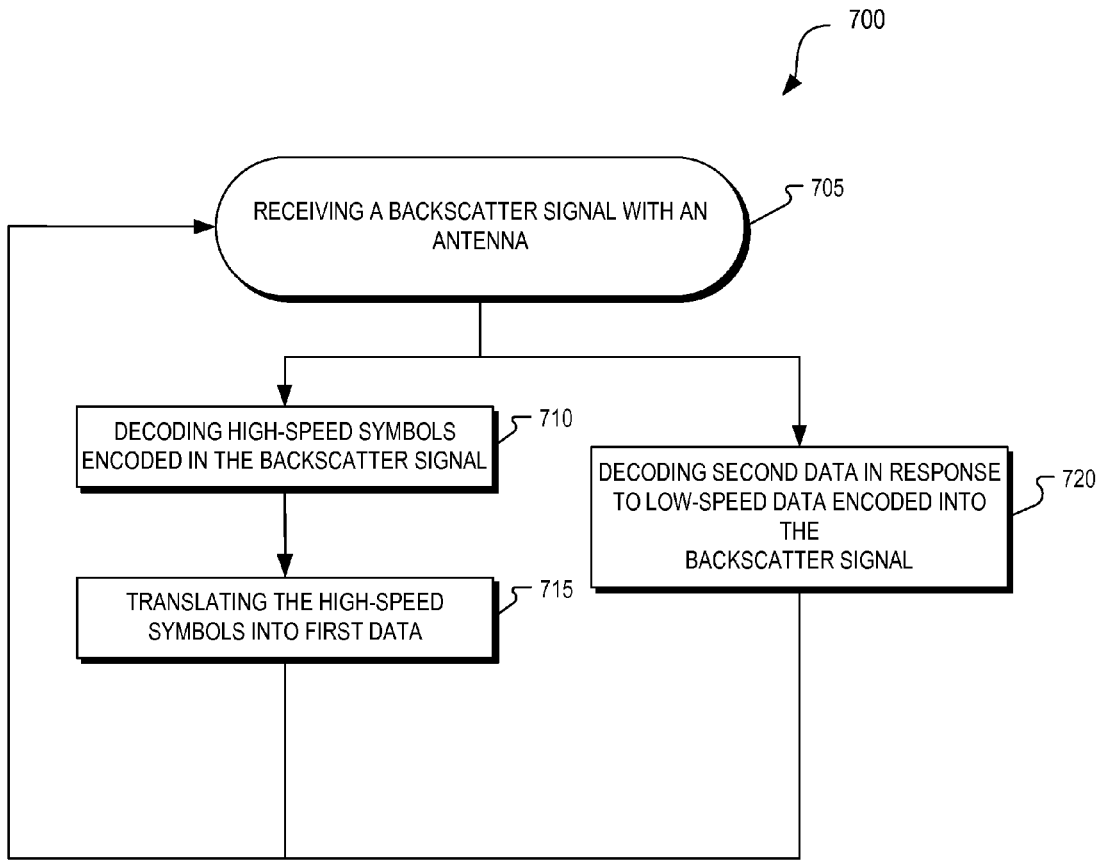
FIG. 7 illustrates a flow chart illustrating a method of backscatter communication utilizing a base station, in accordance with an embodiment of the disclosure.

FIG. 7 illustrates a flow chart illustrating a method of backscatter communication utilizing a base station, in accordance with an embodiment of the disclosure. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel.

In process block 705, a backscatter signal (e.g. backscatter signal 217) is received with a backscatter receiving antenna (e.g. antenna 215). The backscatter signal is a modulated version of an electromagnetic transmission signal that is transmitted by a transmitting antenna (e.g. antenna 210). The backscatter receiving antenna and the transmission antenna may be the same antenna, in some embodiments. The transmission signal may be reflected back as a modulated backscatter signal by a tag (e.g. tag 307) within a mobile device (e.g. device 310).

High-speed symbols encoded into the backscatter signal are decoded in process block 710. The high-speed symbols are encoded into the backscatter signal at a first frequency (e.g. 25 MHz.)

In process block 715, the high-speed symbols are translated into first data (e.g. data 271). The high-speed symbols include a first subset of symbols and a second subset of symbols. Corresponding symbols from the first subset and the second subset are translated to have the same data character in the first data.

Second data (e.g. data 272) is decoded in response to low-speed data encoded into the backscatter signal, in process block 720. The low-speed data is encoded into the backscatter signal at a second frequency (e.g. 125 kHz.) that is less than the first frequency that the high-speed symbols are encoded at. Since tag 307A encodes the second data by sending a first subset of high-speed symbols for a length of time (e.g. between signals of CLK2) to indicate a first state (e.g. digital zero) of the second data and by sending a second subset of high-speed symbols to indicate a second state (e.g. digital one) of the second data, the second data gets a first state when the high-speed symbols are in the first subset for a certain length of time and second data gets a second state when the high-speed symbols are in the second subset for the length of time. The length of time corresponds with a period of the second frequency, in one embodiment.

It is understood that process blocks 710/715 and 720 may be executed in parallel (as illustrated) or that they may be executed serially. Process 700 may repeat to continually decode data coming from backscatter signals. It is appreciated that a base station that utilizes process 700 will be capable of decoding high-speed data as well as supporting low-speed data. Therefore, a tag that sends only low-speed data will be compatible with the base station and a tag that sends only high-speed data (utilizing QAM, as an example) will also be compatible with the base station. Furthermore, a tag (e.g. tag 307) that can send both low-speed data and high-speed data will also be compatible with a base station (e.g. base station 203) utilizing process 700.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A mobile device comprising:
an antenna configured to receive electromagnetic energy from an RFID base station;
modulation circuitry coupled to modulate the antenna between a plurality of impedance values to change a radar cross-section of the mobile device for communicating with the RFID base station via backscattering of the electromagnetic energy; and
an encoding module coupled to encode first data at a higher frequency by directing the modulation circuitry to select between the plurality of impedance values and further coupled to encode second data at a lower frequency by directing the modulation circuitry to select among either a first subset or a second subset of the plurality of impedance values for a length of time, wherein a first data state of the second data is represented by selecting among the first subset during the length of time, and wherein a second data state of the second data is represented by selecting among the second subset during the length of time.

2. The mobile device of claim 1 further comprising:
a biometric sensor coupled to generate at least one of the first data or the second data.

3. The mobile device of claim 1, wherein the antenna is also configured to receive at least one of WiFi or cellular data.

4. The mobile device of claim 1, wherein the first data is a higher resolution version of the second data.

5. The mobile device of claim 4 further comprising:
a first analog-to-digital converter ("ADC") configured to sample a first signal at the higher frequency to generate the first data; and
a second ADC configured to sample a second signal at the lower frequency to generate the second data.

6. The mobile device of claim 1, wherein the first subset of the plurality of impedance values includes impedance values that are common to the second subset of impedance values and also includes impedance values that are different from the second subset of impedance values.

7. The mobile device of claim 1, wherein the encoding module includes first selector logic coupled to select impedance values from among the first subset in response to the first data, and wherein the encoding module includes second selector logic coupled to select impedance values from among the second subset in response to the first data, the encoding module configured to connect the antenna to the impedance values from the first subset when the second data has the first data state and the encoding module configured to connect the antenna to the impedance values from the second subset when the second data has the second data state.

8. The mobile device of claim 1, wherein the first subset of the plurality of impedance values does not share impedance values with the second subset of the plurality of impedance values.

9. The mobile device of claim 1, wherein the mobile device comprises one of a mobile phone, a head wearable display, a wrist watch, a body-mountable device, a body implantable device, a tablet, or a laptop.

10. The mobile device of claim 1, wherein the length of time corresponds to a period of the lower frequency.

11. A radio-frequency identification ("RFID") tag comprising:
modulation circuitry coupled to modulate an antenna between a plurality of impedance values to change a radar cross-section of the RFID tag for communicating with an RFID base station, wherein the antenna is configured to receive electromagnetic energy from the RFID base station; and
an encoding module coupled to encode first data at a higher frequency by directing the modulation circuitry to select between the plurality of impedance values and further coupled to encode second data at a lower frequency by directing the modulation circuitry to select among either a first subset or a second subset of the plurality of impedance values for a length of a time, wherein a first data state of the second data is represented by selecting among the first subset during the length of time, and wherein a second data state of the second data is represented by selecting among the second subset during the length of time.

12. The RFID tag of claim 11, wherein the encoding module includes first selector logic coupled to select impedance values from among the first subset in response to the first data, and wherein the encoding module includes second selector logic coupled to select impedance values from among the second subset in response to the first data, the encoding module configured to connect the antenna to the impedance values from the first subset when the second data has the first data state and the encoding module configured to connect the antenna to the impedance values from the second subset when the second data has the second data state.

13. The RFID tag of claim 11, wherein the first subset of the plurality of impedance values includes impedance values that are common to the second subset of impedance values and also includes impedance values that are different from the second subset of impedance values.

14. The RFID tag of claim 11, wherein the first subset of the plurality of impedance values does not share impedance values with the second subset of the plurality of impedance values.

15. The RFID tag of claim 11, wherein the first data is a higher resolution version of the second data.

16. The RFID tag of claim 11, wherein the antenna is also configured to receive at least one of WiFi, Bluetooth, or cellular data.

17. A method of backscatter communication comprising:
receiving electromagnetic energy from a base station;
encoding first data by adjusting, at a first frequency, a radar cross-section of a device between a plurality of radar cross-sections of the device to modulate the electromagnetic energy reflected back to the base station; and
encoding second data at a second frequency by limiting the adjusting of the plurality of radar cross-sections to either a first subset or a second subset of the plurality of radar cross-sections for a length of time corresponding to one period the second frequency, wherein a first data state of the second data is represented by selecting among the first subset during the length of time, and wherein a second data state of the second data is represented by selecting among the second subset during the length of time, the second frequency being less than the first frequency.

18. The method of claim 17, wherein the first subset of the plurality of radar cross-sections includes radar cross-sections that are common to the second subset of radar cross-sections and also includes radar cross-sections that are different from the second subset of radar cross-sections.

19. The method of claim 17, wherein the first subset of the plurality of radar cross-sections does not share radar cross-sections with the second subset of the plurality of radar cross-sections.

20. The method of claim 17, wherein adjusting the radar cross-section of the device includes selecting different impedance values of an antenna of the device.

21. The method of claim 17, wherein the second data is derived from the first data or is a smaller subset of the first data.

22. The method of claim 17, wherein the second data is backwards compatible with EPC Gen2 RFID protocol.

\* \* \* \* \*